United States Patent
Gelda et al.

(10) Patent No.: US 11,783,436 B2
(45) Date of Patent: Oct. 10, 2023

(54) MAGELLAN: A CONTEXT-AWARE ITINERARY RECOMMENDATION SYSTEM BUILT ONLY USING CARD-TRANSACTION DATA

(71) Applicant: VISA INTERNATIONAL SERVICE ASSOCIATION, San Francisco, CA (US)

(72) Inventors: Dhruv Gelda, Palo Alto, CA (US); Konik Kothari, Champaign, IL (US); Wei Zhang, Palo Alto, CA (US); Hao Yang, Palo Alto, CA (US)

(73) Assignee: Visa International Service Association, San Francisco, CA (US)

( * ) Notice: Subject to any disclaimer, the term of this patent is extended or adjusted under 35 U.S.C. 154(b) by 106 days.

(21) Appl. No.: 16/891,993

(22) Filed: Jun. 3, 2020

(65) Prior Publication Data
US 2020/0387988 A1    Dec. 10, 2020

Related U.S. Application Data

(60) Provisional application No. 62/857,143, filed on Jun. 4, 2019.

(51) Int. Cl.
*G06Q 50/14*   (2012.01)
*G06Q 40/12*   (2023.01)
(Continued)

(52) U.S. Cl.
CPC .............. *G06Q 50/14* (2013.01); *G06F 16/22* (2019.01); *G06F 16/2379* (2019.01);
(Continued)

(58) Field of Classification Search
USPC ........................................................ 705/7.29
See application file for complete search history.

(56) References Cited

U.S. PATENT DOCUMENTS

| 8,627,488 B2 * | 1/2014 | Cormode ............... G06F 21/10 |
| | | 726/28 |
| 8,784,214 B2 * | 7/2014 | Parks ..................... H04L 67/52 |
| | | 463/40 |

(Continued)

FOREIGN PATENT DOCUMENTS

CN    107436950 A   * 12/2017    ......... G06F 16/9535

OTHER PUBLICATIONS

Minock, M. "Relational Representations." Notas de curso Advanced Data Models and Systems, Departamento de Ciencias de Computadoras, Umea University, Suecia (2004). (Year: 2004).*

Primary Examiner — Brian M Epstein
Assistant Examiner — Kristin E Gavin
(74) Attorney, Agent, or Firm — K&L Gates LLP

(57) ABSTRACT

A dynamic next-stop or next-item recommendation system that is built entirely from raw card transaction data logs. These data logs contain rich transaction data between cardholders and merchants. A query network approach is constructed for geometrical expressivity and automatically learns the inherent class-hierarchy. To ensure scalability and interpretability of the approach, merchants or entities are grouped into interpretable categories and propose a quadtree-based spatial decomposition of the underlying geography. A two-step recommendation process initiates: (1) predict next-merchant quadtree-box and category combination (2) recommend merchants within the predicted combination. This novel neural architecture may handle the hierarchical classification task in the first part of the recommendation system and compare the methods to previous state-of-the-art approaches in related areas.

18 Claims, 9 Drawing Sheets

(51) Int. Cl.
 *G06Q 30/0201* (2023.01)
 *G06F 16/23* (2019.01)
 *G06T 11/00* (2006.01)
 *G06F 16/248* (2019.01)
 *G06N 5/04* (2023.01)
 *G06N 20/00* (2019.01)
 *G06F 16/22* (2019.01)

(52) U.S. Cl.
 CPC ............. *G06F 16/248* (2019.01); *G06N 5/04* (2013.01); *G06N 20/00* (2019.01); *G06Q 30/0201* (2013.01); *G06Q 40/12* (2013.12); *G06T 11/00* (2013.01)

(56) References Cited

U.S. PATENT DOCUMENTS

| | | | |
|---|---|---|---|
| 2007/0192254 A1* | 8/2007 | Hinkle | G06Q 20/401 705/51 |
| 2015/0332414 A1* | 11/2015 | Unser | G06F 16/285 705/30 |
| 2017/0060875 A1* | 3/2017 | Arora | G06Q 10/04 |
| 2017/0178149 A1* | 6/2017 | Morimura | G07F 9/026 |
| 2018/0246943 A1* | 8/2018 | Avagyan | G06F 16/29 |
| 2019/0057109 A1* | 2/2019 | Albrecht | G06F 16/173 |

\* cited by examiner

FIG. 1

$$box_{area} = \frac{\pi R^2}{180}(sin(lat_{max}) - sin(lat_{min}))(lon_{max} - lon_{min}),$$

FIG. 2
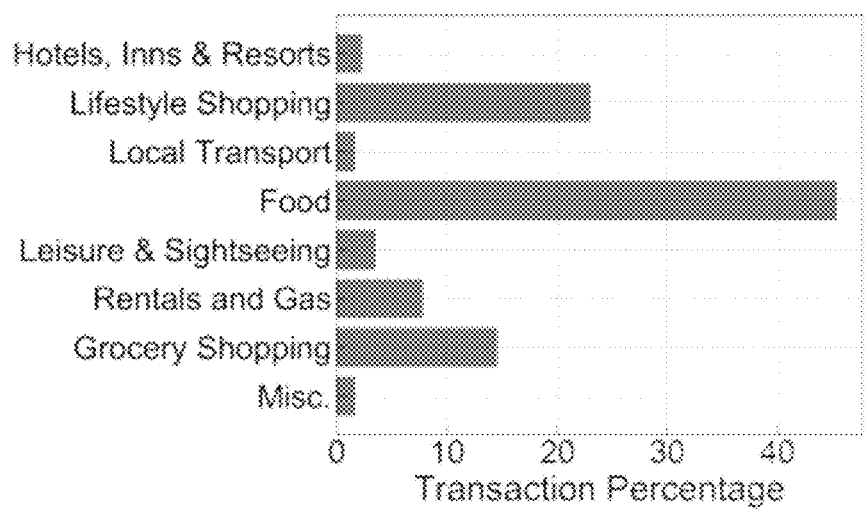
(A) MERCHANT CATEGORY GROUP (MCG) DISTRIBUTION
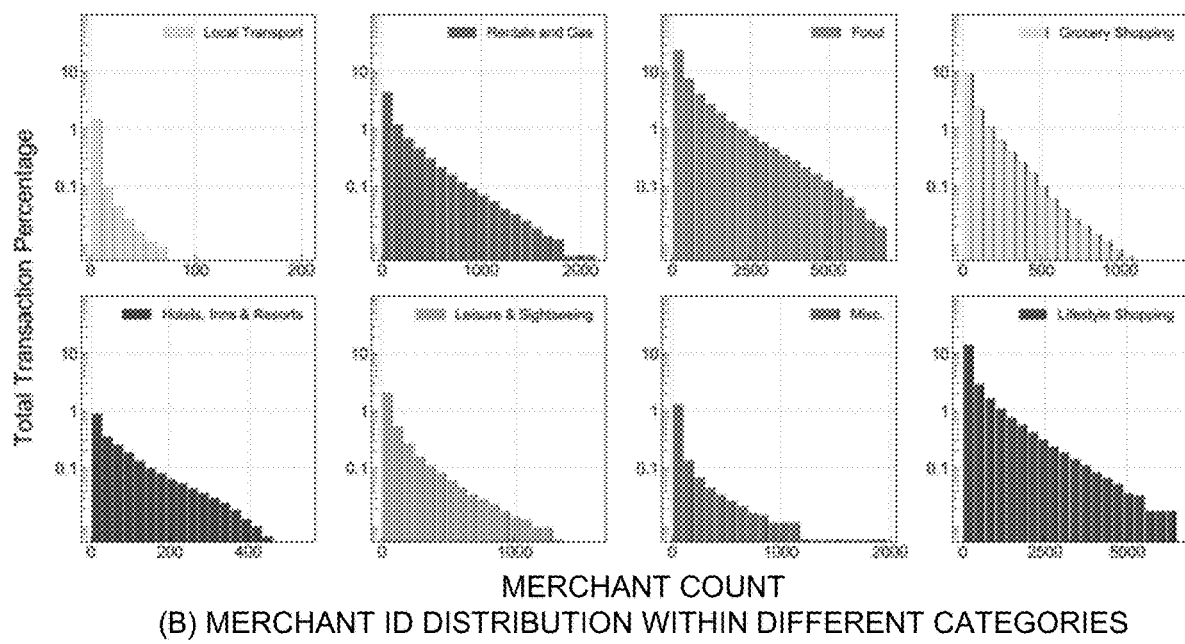
MERCHANT COUNT
(B) MERCHANT ID DISTRIBUTION WITHIN DIFFERENT CATEGORIES

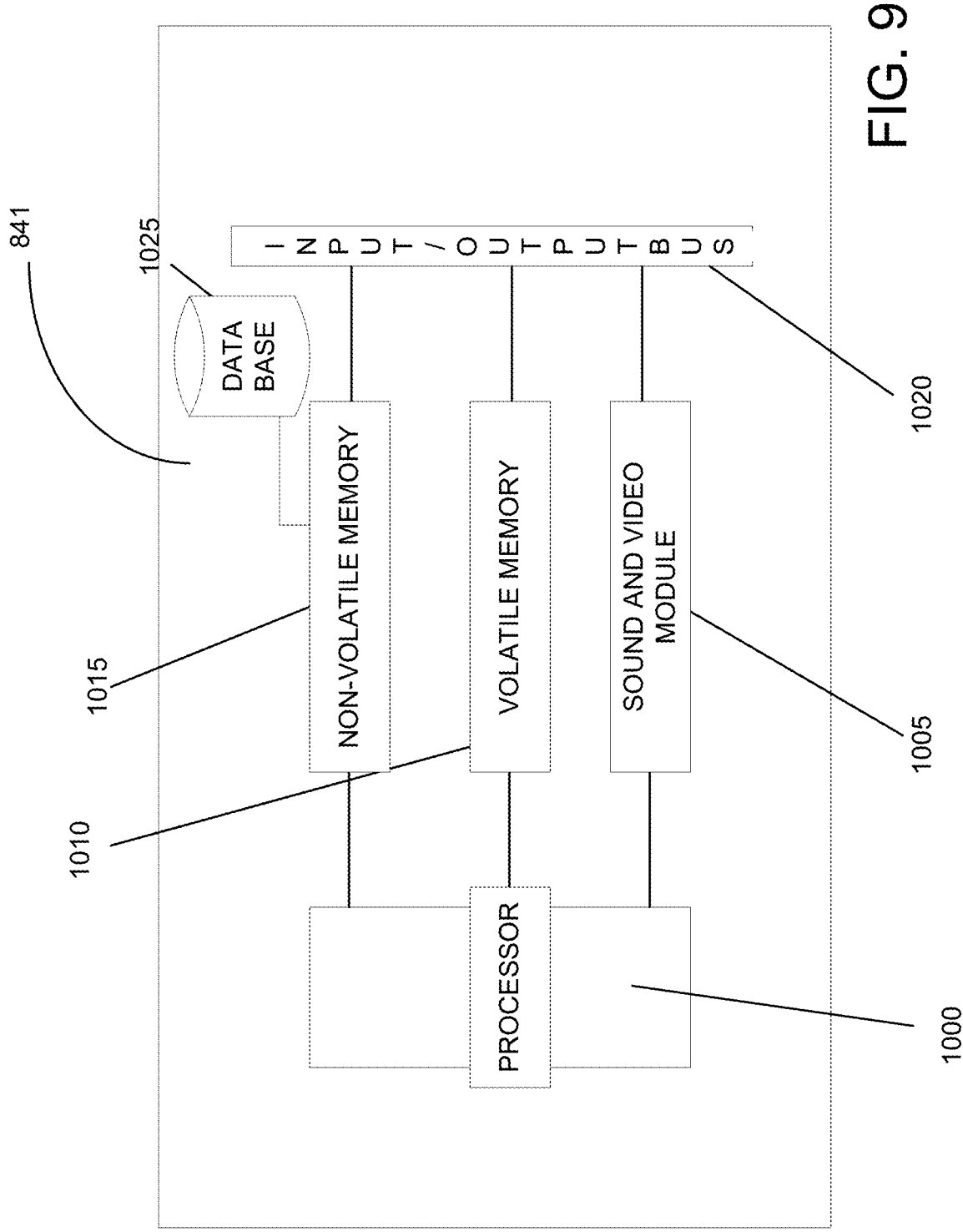

MAGELLAN: A CONTEXT-AWARE ITINERARY RECOMMENDATION SYSTEM BUILT ONLY USING CARD-TRANSACTION DATA

CROSS-REFERENCE TO RELATED APPLICATION

This nonprovisional application claims priority to a U.S. provisional application Ser. No. 62/857,143, filed on Jun. 4, 2019, whose disclosure is incorporated by reference in its entirety herein.

BACKGROUND

Consumer and businesses around the world, are continually moving away from cash and checks to credit and debit cards for all forms of financial transactions. Such migration towards a cashless future is enabled via the enrollment of both merchants and consumers onto a common electronic payments network. Each transaction passes through the network for authorization and is logged in a secure database. Each transaction contains information, for example, regarding the consumer, merchant, amount, geo-location, time, etc.

Today, travel websites provide information on popular travel locations that help users plan their travel. These websites give location-specific information along with crowdsourced reviews (e.g., TripAdvisor®, Google® Reviews). Unfortunately, there are several limitations to such an approach. For example, any information on this website must be crowdsourced which is be quite cumbersome and time-consuming. Explicit reviews from the crowd-sourcing are very sparse. Moreover, explicit reviews are burdened by the issue of credibility while getting expert review is infeasible and expensive.

Also, these recommendation engines have what is known as a "cold-start problem". For a merchant location or a location to become popular, a lot of travelers need to "discover" said location and then manually post a review online. As such, there could be a substantial amount of lag time before the location is "available" or "discovered". On the other hand, if there are any merchants that accept card payments in the location—which is increasingly likely today—one may potentially automatically identify the location if such transaction data is made available as a recommendation to users.

Additionally, existing systems require active user participations before personalized recommendations may be provided.

Unlike abstract preference data gleaned from a user's activity on social media platforms, transaction data helps construct a more accurate profile of a consumer's spending habits.

SUMMARY

Aspects of the invention may utilize transaction data to build a personalized travel recommendation system that serves as an artificial intelligence (AI) or a robot-concierge and suggest items for a user's travel itinerary. Unlike most previous work, which directly provide Point of Interest (POI) recommendations, aspects of the invention aim to build a system that correctly predicts a consumer's next travel category, i.e. location and merchant type and then use the predicted location to provide personalized recommendations. This allows for additional interpretability and scalability of the model to be discussed below.

Another aspect of the invention build a data structure based on the transactions and create a dynamic category at various levels. With the data structure, in addition to the personalized travel recommendation system discussed above, aspects of the invention may further provide additional recommendations, such as entertainment (e.g., music, movie, etc.) literary (e.g., books, comics, etc.), and art work, etc. Additional reviews or ratings of travel locations or the merchants at these locations are not needed from the user. Moreover, privacy of the users are important and techniques may be employed as part of embodiments of the invention.

Furthermore, new and upcoming merchant locations may consequently identify popular tourist spots without the need for users to post reviews. Moreover, users need not do any additional work except use their cards to pay.

As a further embodiment, aspects of the invention expand on the previous recommendations to build consumer profiles automatically without the need for users to enter information manually to location-based social-media platforms.

BRIEF DESCRIPTION OF THE DRAWINGS

Persons of ordinary skill in the art may appreciate that elements in the figures are illustrated for simplicity and clarity so not all connections and options have been shown to avoid obscuring the inventive aspects. For example, common but well-understood elements that are useful or necessary in a commercially feasible embodiment may often not be depicted in order to facilitate a less obstructed view of these various embodiments of the present disclosure. It will be further appreciated that certain actions and/or steps may be described or depicted in a particular order of occurrence while those skilled in the art will understand that such specificity with respect to sequence is not actually required. It will also be understood that the terms and expressions used herein may be defined with respect to their corresponding respective areas of inquiry and study except where specific meanings have otherwise been set forth herein.

FIG. 1 is an expression defining a geographical area recommendation according to one embodiment of the invention.

FIG. 2 is a collection of graphs illustrating an aggregated transaction statistics over 10 thousands in an exemplary travel itinerary dataset according to one embodiment of the invention.

FIG. 9 is a diagram illustrating a remote computing device according to one embodiment of the invention.

DETAILED DESCRIPTION

Figure 3:
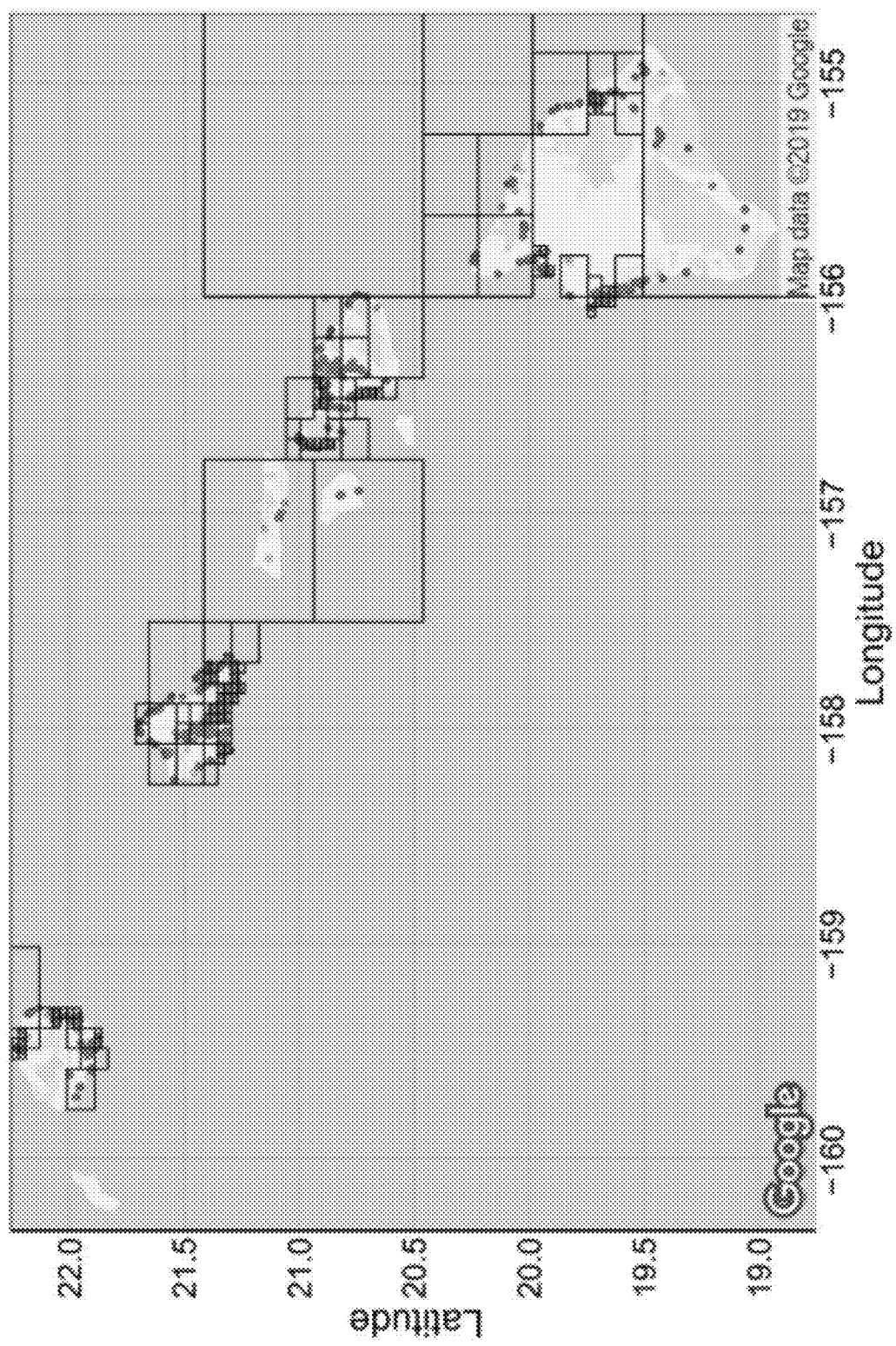
FIG. 3 is a diagram illustrating box-id classes are used as proxy for locations in a geographical area recommendation according to one embodiment of the invention.

The present invention may now be described more fully with reference to the accompanying drawings, which form a part hereof, and which show, by way of illustration, specific exemplary embodiments by which the invention may be practiced. These illustrations and exemplary embodiments may be presented with the understanding that the present disclosure is an exemplification of the principles of one or more inventions and may not be intended to limit any one of the inventions to the embodiments illustrated. The invention may be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods, systems, computer readable media, apparatuses, or devices. Accordingly, the present invention may take the form of an entirely hardware embodiment, an entirely software embodiment, or an embodiment combining software and hardware aspects. The following detailed description may, therefore, not to be taken in a limiting sense.

In one embodiment, aspects of the invention break down merchant recommendation to users into two steps. In one example, the merchant location and category may be predicted via classification algorithms. The predicted merchant attributes may be used next to serve relevant merchants to users. With this approach, the recommendation engines may become interpretable while also providing opportunities for scalability.

In one embodiment, a method to create vector embeddings to uniquely represent each customer/merchant where similar customers/merchants are represented as being close to the vector embeddings in Euclidean distance in the learnt vector space. For example, in the implementation directed to travel recommendations or predictions, a data-driven quadtree decomposition of a travel region in order to bind locations is used. This approach differs from existing or standard practice of using zip codes or other geographical metadata. In one example, a quadtree decomposition may involve subdividing an image into blocks that are more homogenous than the image itself. For example, to perform a quadtree decomposition of a 512-by-512 grayscale image may be implemented using the following instructions:

In one embodiment, the image needs not be a map but it may be a two-dimensional representation of underlying data. For example, the Traditional recommendation systems (such as TripAdvisor®, Expedia,® etc.) rely on crowdsourced reviews to provide a bag of popular Point-of-Interests (POIs). But, aggregation over thousands of POI ratings/reviews makes the recommendations generic and not personalized to any user's preferences. More recently, recommendation systems built on location-based social networks (LBSNs) like Foursquare®, Gowalla®, Facebook® Place, Yelp® etc., have gained popularity. For instance, Foursquare® has more than 50 million monthly active users with more than 12 billion total check-ins, and the Yelp® mobile app witnessed 34 million unique visitors in Q3 2018. Such LBSNs allow users to share their location via check-ins, explore nearby POIs such as restaurants, shopping malls, etc., and contribute reviews to describe their experiences.

However, due to the sparsity of user-POI rating matrix and cold-start problems, inferring preference patterns from a user's past activities is still not straightforward. Some of the earliest approaches to overcome such challenges include collaborative filtering, and matrix factorization. Further generalization has been made possible via graph-based approaches. Another example includes, deep learning techniques have also been developed that learn vector space representations or embeddings of POIs and users in order to combine collaborative filtering and graph approaches. While the aforementioned approaches allow a certain level of personalization, they suffer from the following major drawbacks:

Context-Aware:

The recommendations are static and don't update dynamically based on whether the user has already visited a POI. For example, a user who had lunch recently may not want to visit another restaurant for some time.

Coverage:

Popularity is a key metric that drives the growth of travel destinations. Under the LBSN-based recommendation system, it is difficult for travelers to explore relatively newer POIs which experience fewer foot-falls.

Explicit Feedback:

There is still a significant reliance on explicit feedback from users regarding their experience for a particular POI.

Also, the lack of any sequential order amongst the recommended POIs makes it difficult to utilize the suggestions towards planning a travel itinerary as an example. In fact, the problem of inferring spatial-temporal pattern from a user's sequential data (such as a travel itinerary) is relatively unexplored.

```
I = imread('liftingbody.png');
    For example, the criterion might be a threshold calculation such as max(block(:))
- min(block(:)) >= 0.27. You can also supply qtdecomp with a function (rather than a
threshold value) for deciding whether to split blocks. For example, you might base
the decision on the variance of the block.
    S = qtdecomp(I,0.27);
    blocks = repmat(uint8(0),size(S));
    for dim = [512 256 128 64 32 16 8 4 2 1];
       numblocks = length(find(S==dim));
       if (numblocks > 0)
          values = repmat(uint8(1),[dim dim numblocks]);
          values(2:dim,2:dim,:) = 0;
          blocks = qtsetblk(blocks,S,dim,values);
       end
    end
    blocks(end,1:end) = 1;
    blocks(1:end,end) = 1;
    imshow(I), figure, imshow(blocks,[ ])
```

Embodiments of the invention provide recommendations for 'next-items' in a user's item, such as music, movies, books, or travel itinerary that are personalized, dynamic and spatiotemporal context-aware. While there exists some literature in the domain of 'next-stop' POIs, their recommendation quality is severely limited (see below). The major challenge lies in building accurate representations (or embeddings) for users/POIs by incorporating more information than just the social context. In the dataset employed in the embodiments, aspects of the invention have access to the past credit/debit card transactions of a user at different POIs which includes information such as time of transaction, geo-location, amount spent, frequency of visits, etc., without requiring any explicit feedback.

Embodiments of the invention leverage global electronic payments network that facilitates millions of transactions per day. Each transaction processed through the network may contain information-rich metadata such as time of transaction, geo-location, amount spent, merchant type (restaurant or gas station), transaction type (online or offline), etc. Without limitation and as an example only, the following illustrates of a travel itinerary recommendation in this disclosure are limited to a dataset to a particular use case: San Francisco Bay Area cardholders traveling to Hawaii in 2018.

Itinerary Extraction

To extract such specific itineraries from raw transaction logs, embodiments of the invention apply a sequence of data filtering techniques. For example, for every cardholder or a user of payment devices (e.g., credit or debit card), embodiments of the invention scan through a three-month transaction history to find the most frequently occurring zip codes. In one example, the length of transaction history may vary depending on other factors, such as whether the cardholder may frequent a particular location due to timeshare, summer home, winter home, or other information. A cardholder is identified as a user in the dataset only if any of the top-5 zip codes belong to the Bay Area in this example. In generally and due to privacy protection policies, the cardholder's registered address is not available as part of the analysis.

Also, as part of this example, embodiments of the invention use the merchant location information to find the selected users' transactions in Hawaii.

Lastly, to construct or recommend travel itineraries, embodiments of the invention arrange these transactions as a temporally ordered sequence. For example, the dataset may be first streamlined or "cleaned," using one or more filters or constraints:

Transaction Continuity ($C_1$):

If two transactions occur within a time-window $t_{cont}$, they are considered part of the same itinerary. If not, the sequence is split, and a new itinerary is constructed from that point onwards.

Minimum Swipes and Expense ($C_2$):

Every itinerary should include a minimum number of transactions $trx_{min}$ and amount spent $exp_{min}$.

Area Coverage ($C_3$):

Since this example is interested in travel recommendation, this example ignores itineraries that span a small geographical area. For instance, if a user has travelled for work, they might not have visited any tourist attractions and majority of the transactions might be concentrated in small area near the hotel. So, a bounding box as a proxy for the itinerary coverage whose area is given by an expression 102 in FIG. 1, where R is the radius of earth, lat and lon correspond to latitude and longitude of a transaction location, respectively, and the subscript denote maximum (max) or minimum (min) values. An itinerary is only included in the dataset if $box_{area} > area_{min}$.

TABLE 1

Parameters to extract travel itineraries.

| Parameter | Value |
| --- | --- |
| $t_{cont}$ | 48 hours |
| $trx_{min}$ | 5 |
| $exp_{min}$ | $ |
| $area_{min}$ | 50 sq. miles |

For each user u, the travel itinerary $I_u$ is then a sequence of transactions that satisfy the constraints $C_1$, $C_2$, and $C_3$. Using the parameters shown in Table 1, aspects of the invention obtain 113486 travel itineraries with a total of 1.8 million transactions, an average of about 15 transactions per itinerary. For further analysis, aspects of the invention split the dataset into 80,000 itineraries for training, and 20,000 for validation and the remaining for evaluation.

Point of Interest (POI) Attributes

Majority of some of the past or existing recommendation systems define POI as a specific point location that might be attractive to users. For the itinerary dataset extracted using transactions, an immediate choice for the POIs may be individual merchants. However, even if aspects of the invention restrict or limit, as an example, to a particular subsection of the dataset, there are over 10,000 merchants with unique merchant IDs. Building a recommendation system with such fine-grained information might not be ideal and possibly irrelevant from an end-user perspective. For instance, there may be multiple Starbucks within two or three blocks of each other that would be considered as separate POIs. It is neither useful nor expected of a recommendation engine to pinpoint which Starbucks should a customer visit.

Further, it may be quite difficult to clearly interpret the results of such a fine-grained recommendation even with aggregate techniques such as confusion matrix. As such, embodiments of the invention adopt a multi-stage approach where the recommendation problem is broken down into two steps: (1) a deep-learning based model is used to predict coarse-grained information such as merchant category and geographical location; and (2) fine-grained recommendations are then served to the end-user based on predictions of the model and merchant popularity.

In one embodiment, to build the coarse-granularity recommendation system, aspect of the invention also redefine the POIs with the following attributes: Merchant Category Group and Box-id as explained in the next subsections.

For example, in the exemplary grouping of a Merchant Category Group (MCG), rather than predicting the individual merchants, aspects of the invention focus on the category of merchant. In one example, around about 10,000 individual merchants are categorized into 8 broad classes as shown below:

Hotels, Inns & Resorts
Lifestyle Shopping: apparel, jewelry, etc.
Local Transport: trains, buses, ferries
Food: restaurants, cafes etc.
Leisure & Sightseeing: Local attractions
Rentals & Gas: car/boat rentals
Grocery Shopping
Miscellaneous A summary of the distribution of transactions across and within different classes is shown in FIGS. 2(*a*) and 2(*b*) respectively. FIGS. 2(*a*) and 2(*b*) are diagrams showing an aggregated transaction statistics over 10 thousands in an exemplary travel itinerary dataset according to one embodiment of the invention. For example, FIG. 2(a) illustrates a distribution of merchant category group (MCG) while FIG. 2(b) illustrate a distribution of merchant IDs within different categories. It is noted in FIG. 2(a) that a class-imbalance in the "Food: restaurants, cafes, etc.," and "lifestyle shopping" groups as restaurants and shopping dominate the transaction dataset used to extract itineraries.

Box-Id

People often spend hours planning their itinerary to minimize the commute between different POIs. Obtaining accurate location prediction is therefore essential to recommend a POI in close proximity to the user. Further, the desirable recommendation system should be able to dynamically adjust based on locations already visited. For instance, if a user or a cardholder has already visited a particular area in the past, it might be useful to recommend new neighborhoods or a finer recommendations of areas based on new merchants who have received transactional data after the last visit.

At a first glance, an immediate choice for location could be to use postal zip codes. One would then pose the location prediction as a multi-class classification problem over all zip codes. But the zip codes are designed for efficient mail delivery and not for recommendation purposes. They are pre-established and don't offer flexible resolution. Also, there might be a few popular zip codes that contain majority of the merchants in a city.

At the same time, a bunch of zip codes may be combined together since they contain very few transactions. This leads to a class imbalance problem in the prediction part of aspects of the invention's recommendation system. To overcome such issues of flexibility and class-imbalance, embodiments of the invention propose the use of Quadtree decomposition.

Quadtree Decomposition

Embodiments of the invention overlay a rectangular box on the entire geographical region of interest. In the example, that corresponds to Hawaii. The rectangular box is then recursively subdivided into four boxes until one of the following two conditions are met:

The area of a box is less than or equal to a threshold value $area_{thr}$.

The number of transactions within a box is less than a threshold value $n_{thr}$.

The first condition in one example, may limit the spatial resolution of each box and the second condition may allow coalescing sparsely visited areas into bigger boxes. In this example, $area_{thr}$ may be set to 10 sq. miles and $n_{thr}$ to 1 percent of total transactions.

For example, after running the quadtree algorithm, embodiments of the invention further prune the boxes that don't belong to any of Hawaiian Islands (e.g., lie completely in ocean) to provide more relevant results. The 165 boxes obtained after such a decomposition (see FIG. 3) correspond to the box-id classes. For example, FIG. 3 illustrates an exemplary quadtree decomposition on the transactions by Bay Area cardholders in Hawaii during 2018. Instead of zip codes, 165 box-id classes are used as proxy for location. Size of the boxes may be dynamically adjusted in the algorithm to minimize the class-imbalance issue. In another embodiment, the map of Hawaiian Islands shown in the background may be obtained using APIs directly from map providers.

Figure 4:
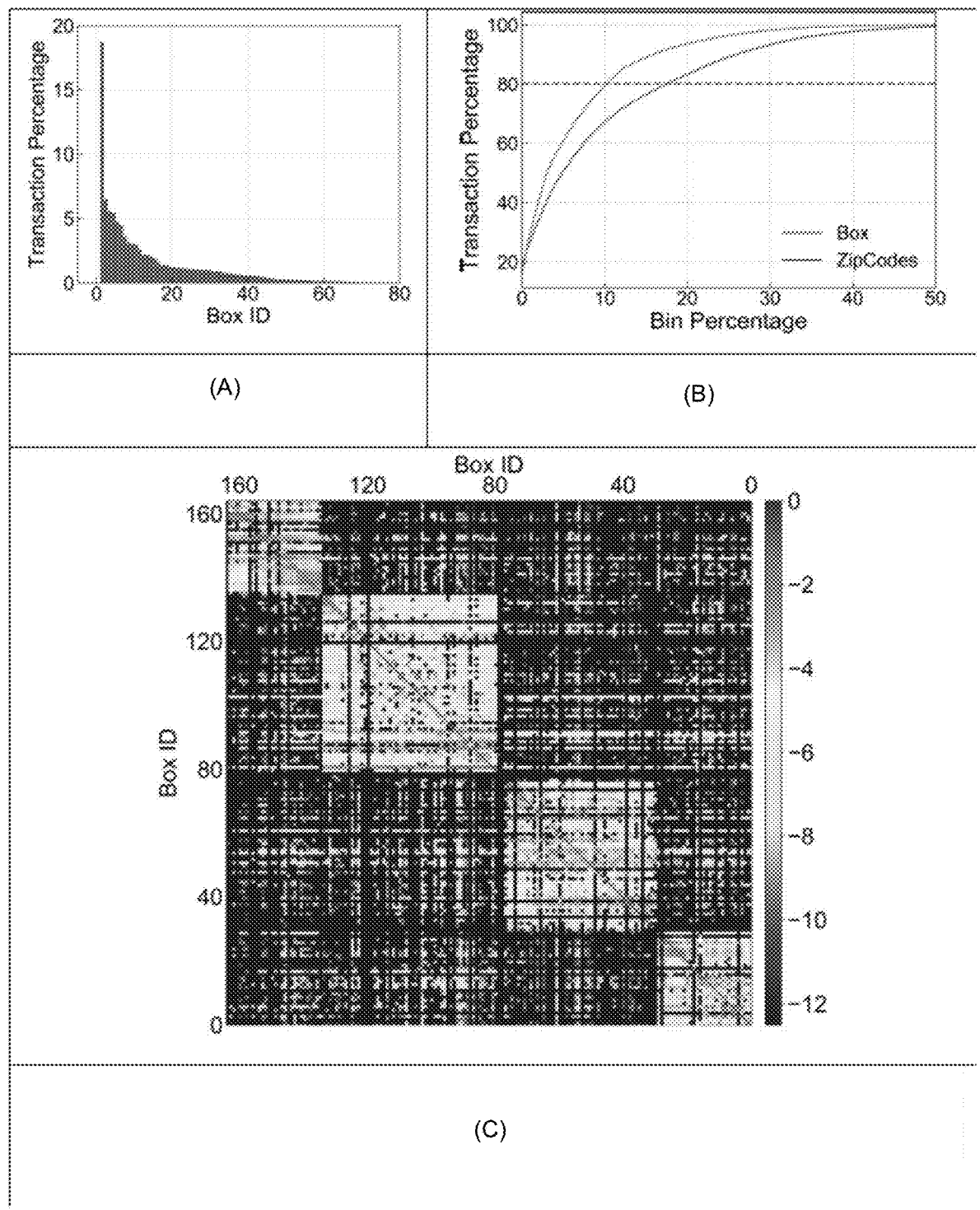
FIG. 4 is a collection of graphs illustrating an aggregated transaction statistics from 165 boxes obtained using quadtree decomposition according to one embodiment of the invention.

A summary of the distribution of transactions among the different boxes is shown in FIG. 4(a). In one example, FIG. 4(a) illustrates a Box-id distribution. In another example, FIG. 4(a) may represent location using boxes obtained from quadtree assist alleviation or imbalance in the class-imbalance issue. FIG. 4(b) further illustrates that a cumulative transaction distribution for boxes as compared to zip codes. In this distribution, twice as many boxes are needed to cover 80 percent of the transactions (17 bins for Boxes vs. 10 bins for zip codes). Note that the use of quadtree may prove even more useful when the recommendation system is scaled to the include the entire United States.

For example, FIG. 4(c) illustrates a Box-id state transition matrix. Each point (i, j) in the matrix may indicate the number of people who visited the i'K box followed by the j'K box. The blue and red regions show the most and least, respectively, popular box-id combinations visited in succession. The scale of color bar next to heat map may shown in logarithmic and arbitrary scale. The boxes may also be sorted in increasing order of latitude. The four rectangular structures shown in the heat map therefore correspond to the four islands: O'ahu, Hawai'i, Maui and Kaua'i.

Itinerary Redefinition

The original itineraries may now be converted into a sequence of POIs with two attributes: box-id ($b_i$) and merchant category group ($cat_i$). Such a coarse-granularity approach offers the following advantages:

Interpretability:

With a few merchant category groups (8) and box-id's (165), aspects of the invention may obtain a detailed understanding of why a particular merchant is recommended in a situation. For instance, if a user makes a transaction at the mall, a system embodying aspects of the invention may predict that he/she might be interested in "Food" or "Lifestyle Shopping". Thereafter, aspects of the invention may recommend most relevant merchants in those categories. It also allows system developers to see the intermediate decisions made by the recommendation system.

Scalability:

The transaction database consists of millions of merchants and the number increases every day. But, since aspects of the invention never predict individual merchants directly, there is no need to continuously train the model. As such, embodiments may update the second step of the recommendation engine with information regarding new merchants.

Adaptive Granularity:

Since the size of boxes ($area_{thr}$, $n_{thr}$) may be controlled or configured in quadtree decomposition, embodiments of the invention may change the granularity of the recommendation system.

In this work, embodiments of the invention aim to plan entire travel itineraries at scale as soon as the customer first uses his or her card. At this level of planning, it is generally not scalable or even feasible to predict the exact merchant. Embodiments of the invention envision a concierge-like system that recommends things-to-do in the area in various categories that a user may like. Therefore, embodiments of the invention break the recommendation problem into two steps: (i) predict the next merchant category group and box-id in which the merchant belongs and (ii) serve the user with relevant merchants in the predicted merchant combination class.

The prediction task is posed as a multi-class classification task. The second part is a simple query of most popular merchants under the predicted combination of box and category. Embodiments of the invention develop new neural architectures to solve the classification task. In this task, the availability of large transaction data corpus outside travel by developing merchant and consumer embeddings are useful.

Consumer and Merchant Embeddings

With a payment processing network of around about 30 billion transactions per quarter across the United States, it is impractical to represent each user and merchant as a one-hot encoding. As such, novel embeddings for the millions of users and merchants in separate lower-dimensional vector spaces are desirable. In a typical social-network based recommendation system, similarity amongst users/items may be derived using the "friendship" or "follower" graphs.

However, such explicit social graphs do not exist for payment device transaction data flowing through a payment network. To measure the similarity amongst the users or merchants, aspects of the invention may first represent each transaction between a particular user "$u_i$" and merchant "$m_j$" as an interaction. Next, embodiments of the invention utilize the ideas introduced in word2vec approach to develop user and merchant embeddings. Essentially, each user/merchant is converted to a vector based on how it appears in context of other users/merchants. The exact procedure followed to develop user embedding eJ and merchant embedding em is described below.

User Embedding

For each unique merchant, a list of all the transactions and the corresponding users is found. The users are then ordered temporally based on the time of transaction and the entire sequence is treated as one sentence. For example, $m_i$: $\{u_1, u_4, u_2, \ldots\}$ may represent the sentence corresponding to a particular merchant $m_i$. By repeating the same procedure across all the active merchants, a corpus of around 78 million sentences is the result. The word2vec training procedure may be applied to obtain a 100-dimensional embedding $e_{ui}$ for each user $u_i$.

Merchant Embedding

In one example, the same procedure outlined above may be used to develop merchant embeddings. The only difference is that the transactions are now grouped by unique users and consequently the 220 million sentences obtained are temporally ordered sequence of merchants such as $u_i$: $\{m_3, m_7, m_2, \ldots\}$. Using the word2vec training procedure again [20], embodiments of the invention obtain a 200-dimensional embedding $em_j$ for each merchant $m_j$.

Moreover, embodiments of the invention evaluate the consumer and merchant embeddings using the standard similarity techniques such as k-nearest neighbors and cosine similarity. The word2vec approach may be able to capture the intrinsic relatedness amongst users/merchants. The t-SNE visualization technique may be employed to further (qualitatively) assess the embeddings. Users with similar taste in grocery stores, restaurants, hotels or who live in neighboring locations tend to be clustered together according to observations of the inventors. Similarly, merchants that fall under the same category (such as restaurants) or who operate in neighboring areas are close in embedding space.

For example, Starbucks would be close to Dunkin' Donuts but far from Chevron gas stations. Using these embeddings, embodiments of the invention may definitely expect to provide quality personalized recommendations for location or merchant category to a user based on other similar users.

As part of the evaluation, any geographical information is not explicitly provided while training the embeddings. The word2vec training procedure uses the context of other users/merchants to infer this.

Final Problem Formulation

Let U denote the set of users, M denote the set of individual merchants, P denote the set of possible POIs, B denote the set of box-ids and C denote the set of merchant category groups. Each user u and individual merchant m may be represented using a pre-trained consumer embedding $e_u$ and merchant embedding em respectively. Any POI item p ∈ P is described by two attributes: box-id (b) and merchant category group (cat), where b ∈ B and cat ∈ C respectively. For each user u∈U, the itinerary $I_u = \{p^1_u, p^2_u, \ldots, p^{t_u}_u\}$ is defined as a sequence of POIs extracted from his/her temporally ordered transactions. Each itinerary POI is $p^j_u = b_j$, $cat_j$), where j represents the time step. A model of the conditional probability φ(p|u; $I_u$; $H^t_m$), where $H^t_m = (m^1, m^2, \ldots m^t)$ represents the sequence of individual merchants corresponding to the itinerary $I_u$. Therefore, the next POI in a user's itinerary sequence is given by $$p_u^{t+1} = \underset{p \in P}{\mathrm{argmax}}\,\varphi((p \mid u; I_u; H_m).$$

Note that the usage of $H_m$ as an input is helpful despite the fact that the model does not need to predict the individual merchant for the next POI in a user's itinerary. As described above, the motivation behind using coarse-grained POI attributes such as box-id and merchant category group is to impart scalability and interpretability to the model. For the end-user of such a recommendation engine, in another embodiment, one would still serve the top relevant individual merchants albeit now in categorized fashion (see below). Therefore, the knowledge of past visited individual merchants helps us tweak the fine-grained recommendations.

Further Embodiments

Long short-term memory (LSTM) architecture for recurrent neural networks have been widely used for learning sequential data (e.g. speech synthesis, music generation, language modeling, time-series forecasting etc.). More recently, attention-based networks have provided state-of-the-art results for tasks such as machine translation, image captioning etc. As described above, a travel itinerary is treated as a sequence of POIs described by box-id and merchant category group.

To predict the next POI in a user's itinerary, in one embodiment, aspects of the invention develop multiple variants of the existing LSTM network architectures that are specifically tailored for the itinerary recommendation task, as well as other tasks, such as music, books, movies, art works, etc.

In one embodiment, the input fed to each network is simply a concatenation of current box-id $b_j$, merchant category group $cat_j$, merchant embedding em and consumer embedding $e_u$. Unless otherwise specified, the box-id and the merchant category group may be a one-hot encoding.

Figure 5:
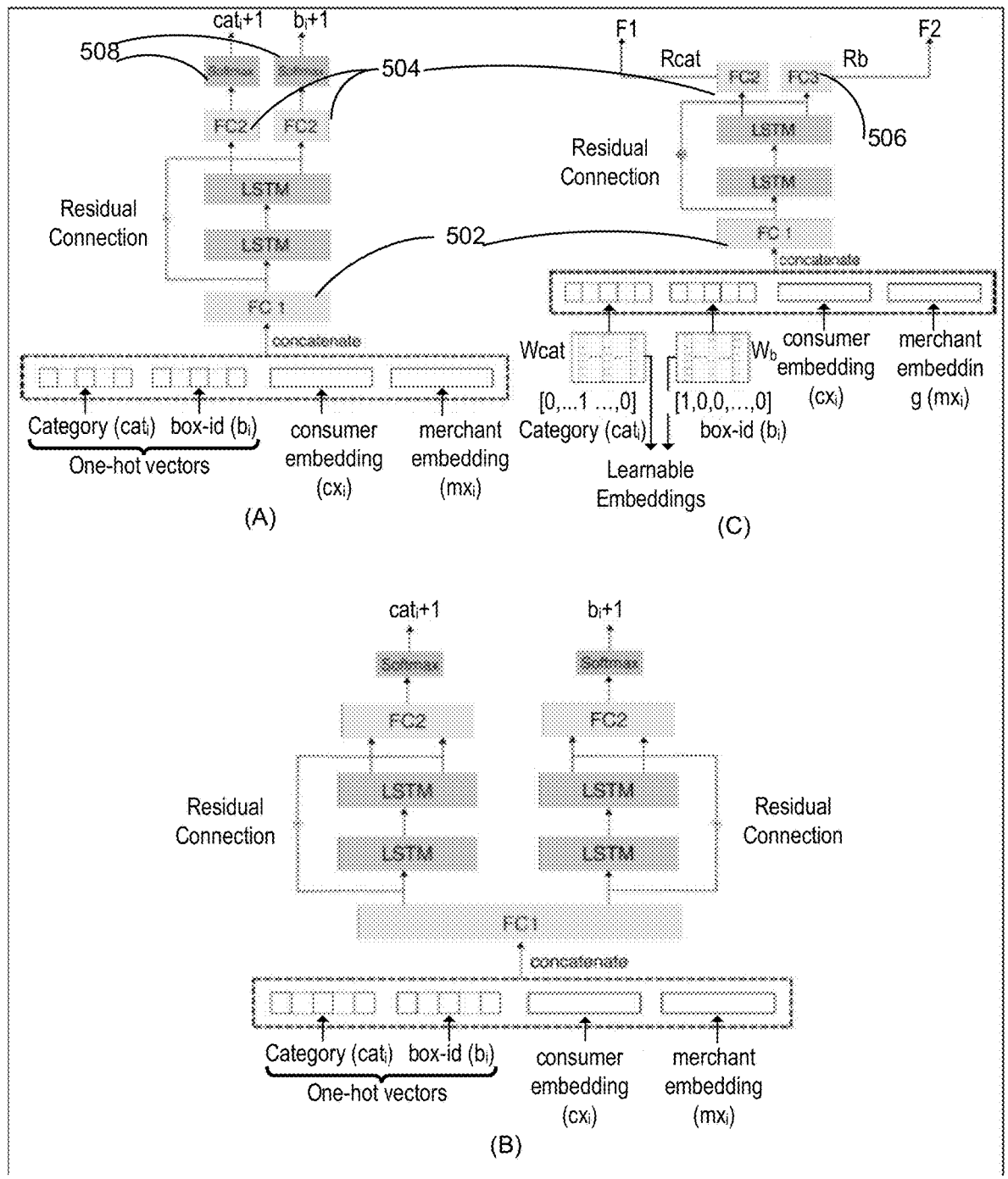
FIG. 5 is a diagram of neural architectures according to one embodiment of the invention.

In one example, since the itinerary size can vary across different users, aspects of the invention use a dynamic LSTM approach with layer-normalization, 256 hidden units and a dropout probability of 0.2. Residual connections may also be added across the stacked LSTM network as shown in FIG. 5. The fully-connected layers have batch-normalization to accelerate training. The batch size may be set to 128 and Xavier initialization is used to initialize the weight matrices. In a further example, Adam optimizer with learning rate 0.001 and a decay rate of 0.98 may be used. Each network architecture is tasked with optimizing a combined loss function that includes losses over box prediction, $\mathcal{L}_b$ and category group prediction, $\mathcal{L}_{cat}$. A weighted sum of the two losses as $$\mathcal{L}_T = \mathcal{L}_{cat} + \lambda \mathcal{L}_b,$$

where λ=5 is a hyper-parameter set by cross-validation.

Moreover, in FIG. 5(c), F1 is represented by an expression:

$$\underset{j}{\mathrm{argmax}}(W_{cat}(j)^T R_{cat}) \rightarrow cat_j + 1$$

while F2 is represented by an expression:

$$b_{j+1} \leftarrow \underset{i}{\mathrm{argmax}}(W_b(j)^T R_b)$$

Vanilla LSTM

The vanilla LSTM network (see FIG. 5(a)) comprises of a fully-connected layer FC1 502 (256 hidden units), two stacked LSTM layers and two fully-connected layers: FC2 504 (165 hidden units) and FC3 506 (8 hidden units) to predict box-id and merchant category group respectively. The network ends with two softmax layers 508, one for each full-connected layer, and is trained by minimizing the cross-entropy loss.

Parallel Encoder-Decoder

In terms of network design, the parallel encoder-decoder network is almost identical to the vanilla LSTM network except that it uses separate LSTM branches for box-id and merchant category prediction as shown in FIG. 5(b).

Query Network

In the network architectures described above, FIG. 5(c) illustrates a flat classification or a two-dimensional approach where any inherent hierarchy amongst the target classes was ignored. However, the POI recommendation task, particularly at coarse-granularity may be naturally cast as a hierarchical classification problem. For instance, consider the classes obtained for box-id via quadtree decomposition. It is reasonable to argue that two boxes with geographical proximity should be more similar compared to a box that is located far away. The box-id state transition matrix (see FIG. 4(c)) also confirms the presence of several clusters among the classes. While aspects of the invention focus on travel itineraries in Hawaii, the four major clusters seen in FIG. 4(c) correspond to the Hawaiian Islands: O'ahu, Hawaii, Maui, and Kaua'i, the Query Network proposed by aspects of the invention that implicitly learns the class-hierarchy based on the mutual affinities of classes while training may be beneficial to other similar structured data, such as music recommendations, movie recommendations, book recommendations, and others. In other words, instead of relying on crowdsourcing users' "likes," or "being added to favorite in a playlist," etc., aspects of the invention introduce a new dynamic way to generate recommendations with the building of embeddings and the query network.

While a majority of the architecture (see FIG. 5(c)) is similar to the aforementioned networks, there are a few significant differences. First, instead of using a one-hot encoding for box-id and merchant category group, embodiments of the invention use learnable embedding $W_b$ and $W_{cat}$ to construct a better representation of these classes. Second, the network in FIG. 5(c) does not need a softmax layer 508 to predict class-probability distribution. The two fully-connected layers, FC2 and FC3, predict a 100-dimensional embedding vector ($R_{cat}$) for merchant category group and 300-dimensional embedding vector for box-id ($R_b$) respectively. The network is trained using a cosine similarity-based loss function defined as the following expression:

$$\mathcal{L}(w_y(k), R_y) = 1 - \frac{w_y(k)^T R_y}{\|w_y(k)\|\|R_y\|},$$

where y∈{b, cat} indicates box-id or merchant category group and $w_y$ (k) is $k^{th}$ column in the learnable embedding table $w_y$ that corresponds to the ground truth label. Essentially, $\mathcal{L}$ enforces the output embedding vector and the true label embedding to be collinear. Another direct consequence of the cosine-similarity loss function is obtaining a better estimate for the misclassification error.

As mentioned earlier, two box-id's in close vicinity represent similar classes and therefore, the network may place them close in embedding space. So, the cost of mistakenly identifying a box with a neighboring box would be smaller in comparison to a box located far away. The predicted class label is given by $$y_{i+1} = \mathrm{argmax}_j \frac{w_y(j)^T R_y}{\|w_y(j)\|\|R_y\|},$$

Aspects of the invention enable the query network approach, for example, for more geometrical expressivity and automatically learns the inherent class-hierarchy. Rather than representing the various classes as corners of a hypercube (one-hot encoding), the classes are geometrically embedded on the surface of a hypersphere. Further, defining the loss-function using embeddings ($W_y$) enabled a higher gradient flow for their learning and also make the embeddings more meaningful to the classification task.

For example, instead of next-stop recommendation or prediction, embodiments of the invention may predict next item. For example, suppose a dataset of queries or searches from an elementary school class includes a plurality of searches of animals. As the query network may be implemented to learn geometrical expressivity and may automatically learn the inherent class hierarchy, e.g., mammals, reptiles, and within each of these there are additional classes therein. These classes may be defined for the network or may be learned by the networked based the training dataset. The query network may then be used in that setting for schools to become a teaching aid or assist students receive search results faster.

In yet another embodiment, the dataset may be a plurality of music titles with different genre and musicians. Again, the music titles may inherently have various class hierarchies and the query network may intelligently learn through these hierarchy and based on the disclosures above, aspects of the invention may provide next-stop recommendation (which movie will the user watch in the next 3 months), etc.

As an illustration, suppose a system embodying aspects of the invention may wish to assist in recommending a new title of books, music, or movie for a user. In response to a user's transaction of a purchase of a title of books, music, or movie, aspects of the invention generate a plurality of datasets matching various categories or characteristics of the user. For example, in one embodiment, the user may be 24 years old female living in an urban area. The system may build a dataset of other female users between ages of 18 to 24 living in an urban area who have purchased a title of books, music, or movie in the last 6 months. It is to be understood that the time frame (6 month) or book/music/movie is one of the parameters of the dataset example and it is meant to be exemplary and not by limitation.

Once the dataset is completed, a vector embedding or vector embedded data is generated for each of the data in the dataset. This vector embedding may include vector space information as a function of the overlay of the quadtree decomposition. For example, by applying a quadtree decomposition of a given size, the dataset in a two-dimensional representation (for simplicity and illustration purposes only and not as a limitation) may reveal clusters of boxes covering a certain age group, a geographical location (e.g., user's zip code), or other factors. The vector embedding may store information regarding the results of the overlaying. That information is further extrapolated in response to the user's recent transactions of a title of books, music, or movie. For example, the dataset with the vector embedding/ embedded data after applying the quadtree decomposition may be mapped to the user's recent transactions in the last 3 months in books, music, or movie. The outcome of such mapping may reveal a possible recommendation to the user.

As such, aspects of the invention avoid using crowdsourcing or other sources of static or stale information that fail to capture the "closeness" of the recommendation.

Evaluation 5.1.1 Baselines n-gram Models. For each user u, the travel itinerary is represented as a sequence $I_u = \{(b_i, cat_i)\}_{i=1}^{T_u}$, where $b_i$ and $cat_i$, are the box-id and merchant category of the $i^{th}$ POI respectively and represents the total number of POIs visited in the itinerary by the user, u. Aspects of the invention train n-gram models using the itineraries obtained for different users. Given a sequence of items (y", y(, y/, ..., y&z"), the n-gram model estimates the conditional p(y&|y", ..., y&z") as $$p(y_n | y_1, \ldots, y_{n-1}) = \frac{C(y_1, y_2, y_3, \ldots, y_n)}{C(y_1, y_2, y_3, \ldots, y_{n-1})},$$

where $C(y_1, y_2, y_3, \ldots, y_n)$ represent the frequency counts of n-gram sequences that occur together in the training corpus. During evaluation, the next box-id and/or merchant category in a sequence is predicted as the $n^{th}$ item in the most frequently occurring n-gram sequence. In this work, embodiments of the invention build n-gram models for n=2 (bigram), 3 (trigram) and 4 (quadgram). Embodiments of the invention also use smoothing techniques such as Katz backoff model to account for missing n-grams. For instance, if a quadgram model does not find the corresponding 4-gram sequence in the training corpus, aspects of the invention fall back on the trigram model and look for the most frequently occurring 3-gram sequences. If the trigram model also does not find the corresponding 3-gram sequence, in another embodiment, aspects of the invention may fall back on the bigram model and so on. Embodiments of the invention train separate n-gram models for box-id ($b_{i+1}$), merchant category ($cat_{i+1}$) and also for combined ($b_{i+1}$, $cat_{i+1}$) prediction. Note that while accuracies on separately trained n-gram models may be reported, in one aspect, embodiments of the invention use a single neural network to predict the next box-id and merchant category simultaneously. In one example, n-gram models are chosen for comparison as they provide a simple yet effective baseline that is intuitively easy to understand. Further, when dataset is proprietary, the widely used n-gram models also provide a reasonable insight into the complexity of predicting the next box-id and merchant category in a user's itinerary.

Aspects of the invention further compare the above baselines to the two models below using two metrics: (1) Item evaluation and (2) Itinerary evaluation.

Sequential Hierarchical Attention Network (SHAN).

A sequential recommendation system where users and items are embedded into low-dimensional spaces learns a user's long term as well as short-term preferences using a two-layer hierarchical attention-based network.

Translation-based Recommendation (TransRec).

A state-of-the-art recommendation system develops representation for POIs in a 'transition space' and users are modeled as a 'translation vector' operating on POI sequences.

Item Evaluation

Majority of the public datasets provide a user-POI interaction matrix but there is no prior knowledge available regarding users and/or POIs. The recommendation systems utilize a significant portion of the dataset to build meaningful representation for the users/POIs. Consequently, a widely used metric to benchmark recommendation systems is to perform evaluation on the last item in a sequence. In order to facilitate a fair comparison, evaluation on the last item in a travel itinerary may be done in one example. For example, embodiments of the invention evaluate proposed methods on the entire travel sequences which is explained below.

Performance Comparison

A comparison of the accuracy results between the proposed models and aforementioned baselines is presented in Table 2. The first, second and third columns show the top-1/top-3 accuracy for box-id, merchant category group and the two classes combined respectively. As shown, the SHAN and TransRec perform poorly on the predicting the next box-id or merchant category, primarily for two reasons. First, both the models require multiple sequences per user of sizable length to construct relevant user/POI embeddings. But the travel itinerary dataset only includes few (about 15 on average) transactions from each user and might not be conducive to learning such representations. Since the user/ merchant embeddings in the proposed models are built from past transaction history (not just limited to travel), embodiments find them to be more meaningful towards the recommendation task. Second, SHAN and TransRec are designed to recommend traditional POIs that correspond to specific point locations. At such fine-granularity, the next item in a sequence is almost always different compared to the previous one. However, for POIs with coarse-granularity attributes, embodiments of the invention find a lot of self-transition behavior. For instance, it is quite likely for a user to have two successive transactions in the same box as shown by the presence of a strong diagonal in the box-id state transition matrix (see FIG. 4(c)).

Interestingly, embodiments of the invention find that n-gram models perform better than other baseline models. At coarse-granularity, the conditional probability tables for n-gram models are not sparse, a feature typical while training on huge corpus of language data. Also, n-gram models aggregate itineraries over users and therefore don't suffer from the paucity of per-user transaction data. Amongst the proposed models, embodiments of the invention find that the query network has clearly outperformed the baseline results with a top-3 accuracy for combined classes equal to 44.7 percent.

Apart from the usage of meaningful embeddings, the success of query network could also be attributed to model's architecture that implicitly learns the hidden class-hierarchy at coarse-granularity.

TABLE 2

Accuracy comparison on last item evaluation metric.

| Mod | Box top-1/3 | Category top- | Combined |
|---|---|---|---|
| 2- | 21.31/36.90 | 30.88/59.82 | 32.0 |
| 3- | 33.34/41.54 | 49.43/71.61 | 37.4 |
| 4- | 34.18/46.76 | 51.27/78.35 | 39.9 |
| Vanilla LSTM | 54.34/72.90 | 49.32/84.68 | 36. |
| Quer | 50.09/71.08 | 57.98/89.50 | 44. |
| SHAN | 10.1/40.9 | 51.7/75.4 | 32. |
| TransRec | 12.5/41.4 | 47.5/70.0 | 27. |

Itinerary Evaluation

Metric

Rather than just the last item, embodiments of the invention also evaluate the proposed models on entire user itineraries. Such a performance metric is more meaningful as it helps assess the quality of 'dynamic' recommendations provided to an end-user irrespective of how many transactions have already occurred. Also, embodiments of the invention partition the dataset such that the users seen during training/validation are not encountered in evaluation.

Performance Comparison

Majority of the recommendation systems including SHAN and TransRec develop user/POI representation during model training. Therefore, it is not possible to compare them against the proposed models on itinerary evaluation, particularly for unknown users. But embodiments of the invention may still use n-gram models for a baseline and as seen from the previous results (see Table 2), they are not trivial. A summary of the accuracy results for n-gram as well as proposed models is shown in Table 3. Embodiments of the invention find that the query network has again outperformed the baseline results with a top-3 accuracy for combined classes equal to 50.9 percent. It is quite remarkable considering that not even a single user (or transaction) in the evaluation set is ever seen during training. This further indicates that the merchant and consumer embeddings embodiments of the invention have developed are meaningful across users for the travel recommendation task.

TABLE 3

Accuracy comparison on itinerary evaluation metric.

| Model | Box top-1 | Category top-1 | Combined top-3 |
|---|---|---|---|
| 2-gram | 30.20 | 43.63 | 35.92 |
| 3-gram | 34.92 | 47.33 | 37.53 |
| 4-gram | 36.81 | 50.53 | 39.59 |
| Vanilla LSTM | 57.72 ± 1.62 | 48.42 ± 1.49 | 40.97 ± 3.15 |
| Query | 54.04 ± 1.49 | 61.80 ± 1.19 | 50.94 ± 2.96 |
| Parallel Encoder-Decoder | 58.74 ± 1.51 | 62.63 ± 1.02 | 48.96 ± 2.77 |

Performance Comparison

Magellan: Itinerary Planner Demo

Figure 6:
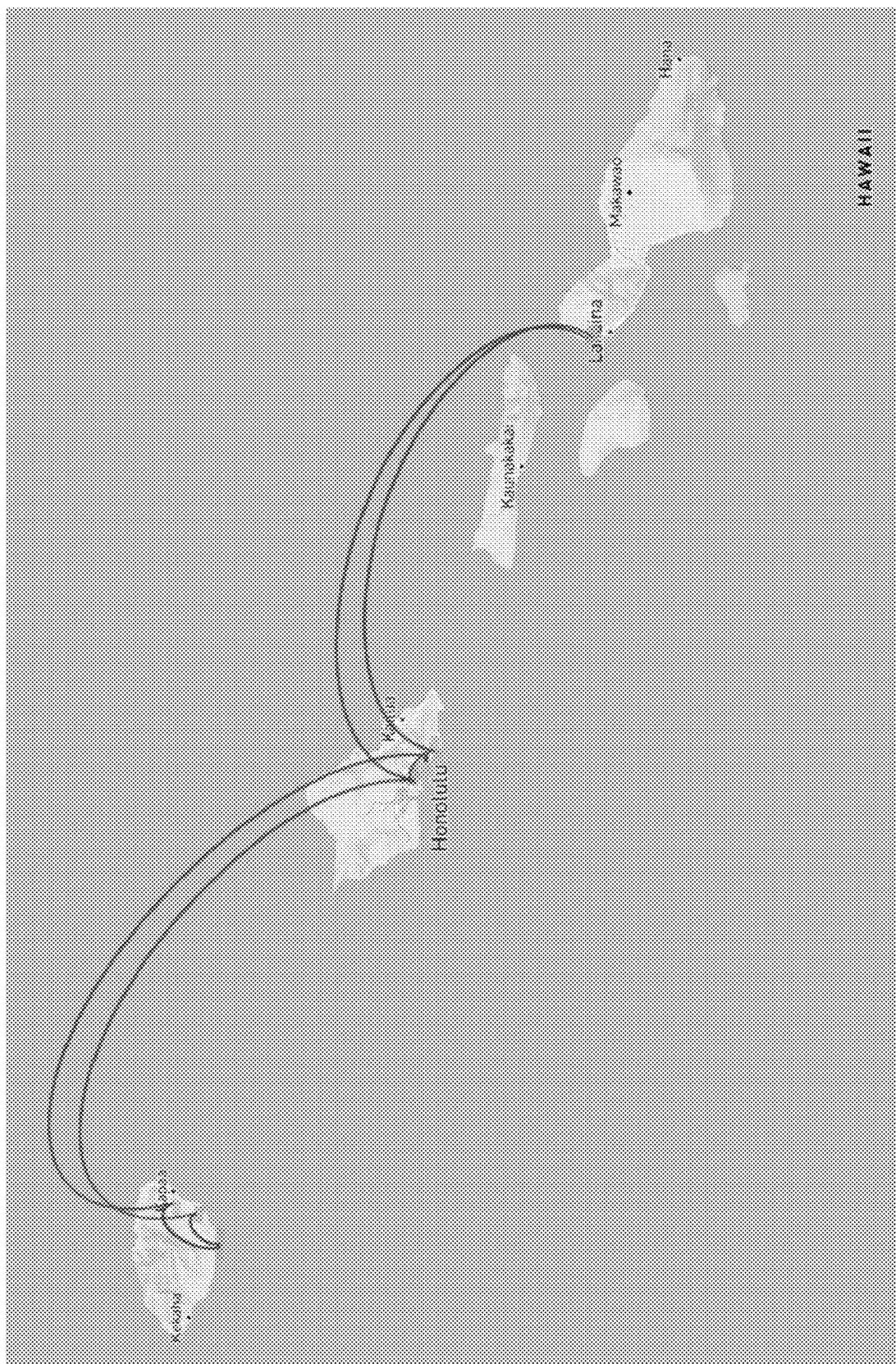
FIG. 6. is a screenshot illustrating travel hopping visualization of a travel recommendation according to one embodiment of the invention.
Figure 7:
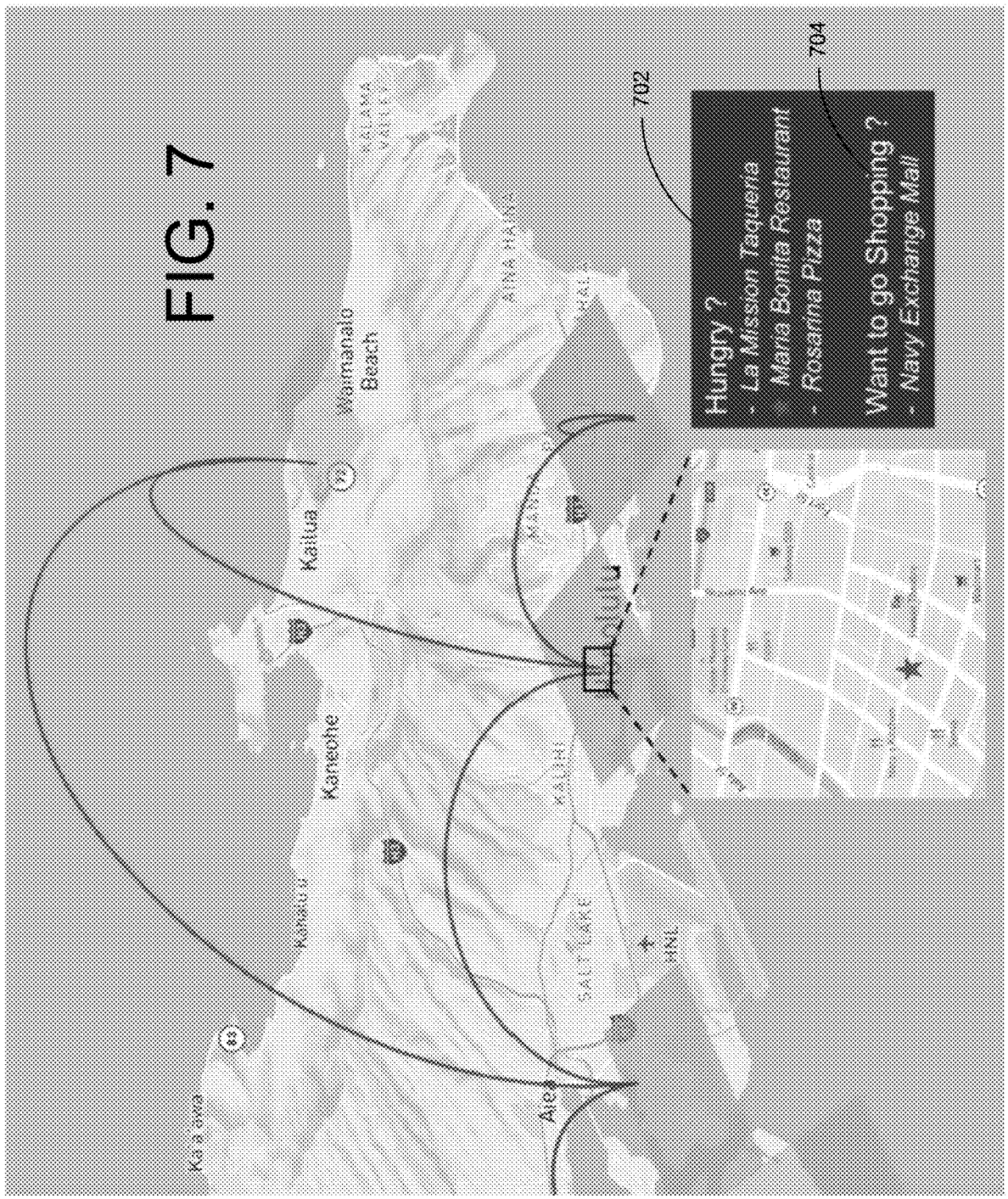
FIG. 7 is a screenshot illustrating predicting next box-id and merchant categories to serve relevant individual merchants to a user exploring a location according to one embodiment of the invention.

Embodiments of the invention have also developed a web application prototype Magellan using deck.gl and React library to serve end-users with itinerary recommendations. The demo helps visualize the travel itinerary and also provide dynamic recommendations to a user based on past transaction history. FIG. 6 illustrates a particular user hopping across the different Hawaiian Islands. Each arc connects two successive travel locations and the highlighted orange region represents the box-id visited by the user. As mentioned earlier, the recommendation is performed in two steps: (1) predict the next merchant category group and box-id (2) use the coarse-grained information to recommend popular individual merchants. FIG. 7 shows the zoomed-in version of an itinerary where the user is vacationing in Honolulu. Based on the past transactions, the query network predicts that the user would like to explore the downtown area and might be interested in "Food" or "Lifestyle Shopping" categories. Embodiments of the invention then recommend, in a pop up box 702, the most popular restaurants and shopping malls near the predicted box location. For this user, the next transaction actually occurred at Maria Bonita Restaurant, one of the model's recommendations.

While neatly categorizing the recommendations for a user, the system also provides interpretability. Instead of just looking at a map marked with recommendations for individual merchants, users (and developers) can also understand the mid-level decisions taken by the recommendation system, i.e. prediction of next box-id and merchant category group.

Moreover, embodiments of the invention propose a first-ever dynamic travel recommendation system that is built only using card transaction data. Embodiments of the invention create a novel dataset entirely from transaction data that consists of 113 k travel itineraries with 1.8 M transactions of Bay area, California cardholders traveling to Hawaii. Embodiments of the invention propose a two-step recommendation system: (i) embodiments of the invention predict the next box and merchant category (ii) embodiments of the invention serve recommendations in the predicted combination. This allows for interpretability of the recommendation engine and also makes for a clean end-user experience. For the first part of the system, embodiments of the invention propose a novel neural architecture query network that outperforms previous techniques developed for successive POIs on the dataset by learning hidden structure within the class taxonomies. Embodiments of the invention find that the consumer and merchant embeddings are particularly useful in this task as the proposed query network handles users it has never seen during training almost as well as those seen during training. This is because embodiments of the invention have access to each user's card transaction data even outside of travel.

In alternative embodiments, aspects of the invention may improve the recommendation system performance by incorporating personalization even when recommending merchants in the predicted combination of box and merchant category in a similarly scalable fashion. Embodiments of the invention are also working towards scaling the demo to provide real-time recommendations.

Figure 8:
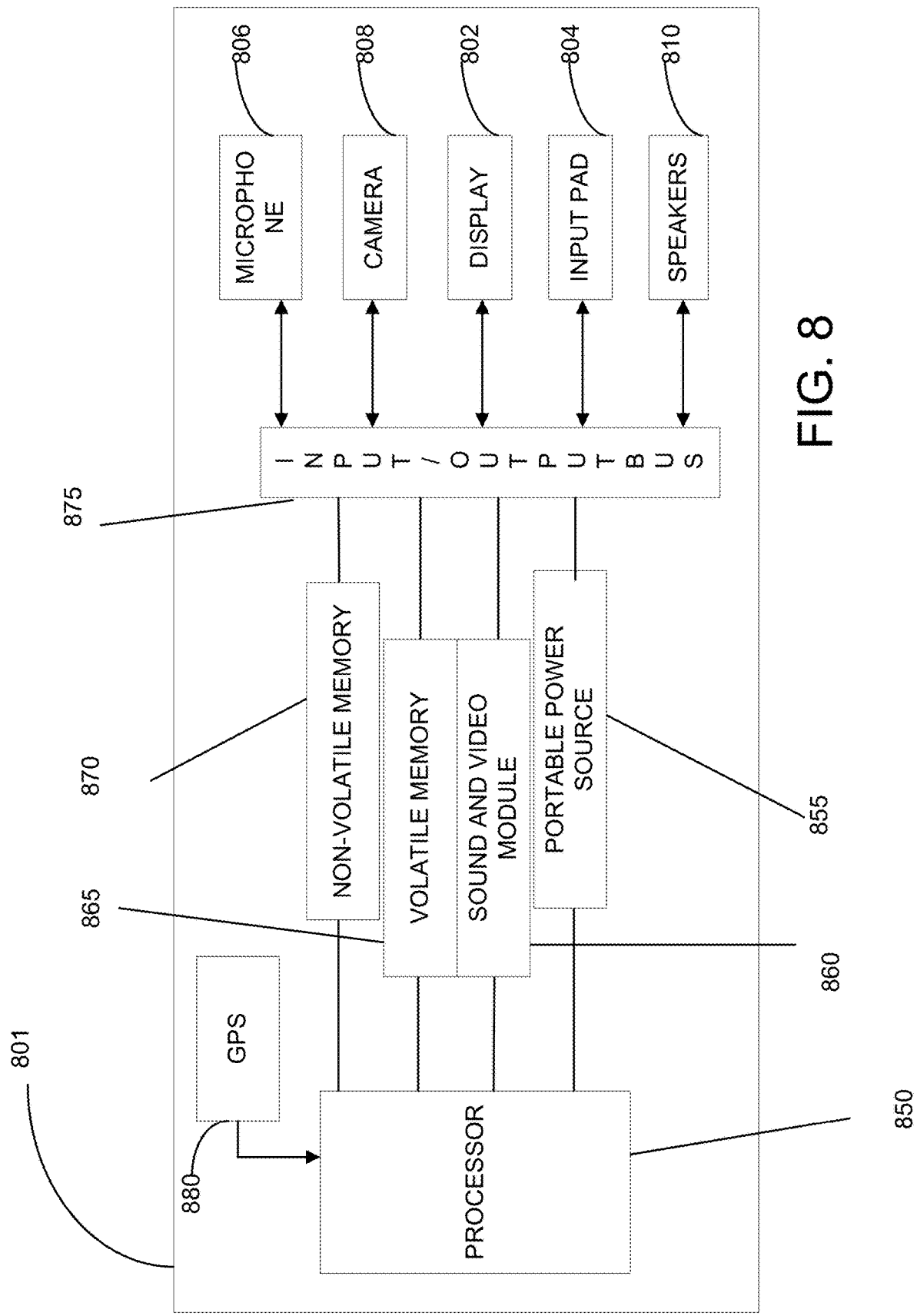
FIG. 8 is a diagram illustrating a portable computing device according to one embodiment of the invention.

FIG. 8 may be a high level illustration of a portable computing device 801 communicating with a remote computing device 841 but the application may be stored and accessed in a variety of ways. In addition, the application may be obtained in a variety of ways such as from an app store, from a web site, from a store Wi-Fi system, etc. There may be various versions of the application to take advantage of the benefits of different computing devices, different languages, and different API platforms.

In one embodiment, a portable computing device 801 may be a mobile device 112 that operates using a portable power source 855 such as a battery. The portable computing device 801 may also have a display 802 which may or may not be a touch sensitive display. More specifically, the display 802 may have a capacitance sensor, for example, that may be used to provide input data to the portable computing device 801. In other embodiments, an input pad 804 such as arrows, scroll wheels, keyboards, etc., may be used to provide inputs to the portable computing device 801. In addition, the portable computing device 801 may have a microphone 806 which may accept and store verbal data, a camera 808 to accept images and a speaker 810 to communicate sounds.

The portable computing device 801 may be able to communicate with a computing device 841 or a plurality of computing devices 841 that make up a cloud of computing devices 811. The portable computing device 801 may be able to communicate in a variety of ways. In some embodiments, the communication may be wired such as through an Ethernet cable, a USB cable or RJ6 cable. In other embodiments, the communication may be wireless such as through Wi-Fi (802.11 standard), Bluetooth, cellular communication or near field communication devices. The communication may be direct to the computing device 841 or may be through a communication network 102 such as cellular service, through the Internet, through a private network, through Bluetooth, etc. FIG. 8 may be a simplified illustration of the physical elements that make up a portable computing device 801 and FIG. 9 may be a simplified illustration of the physical elements that make up a server type computing device 841.

FIG. 87 may be a sample portable computing device 801 that is physically configured according to be part of the system. The portable computing device 801 may have a processor 850 that is physically configured according to computer executable instructions. It may have a portable power supply 855 such as a battery which may be rechargeable. It may also have a sound and video module 860 which assists in displaying video and sound and may turn off when not in use to conserve power and battery life. The portable computing device 801 may also have volatile memory 865 and non-volatile memory 870. It may have GPS capabilities 880 that may be a separate circuit or may be part of the processor 850. There also may be an input/output bus 875 that shuttles data to and from the various user input devices such as the microphone 806, the camera 808 and other inputs, such as the input pad 804, the display 802, and the speakers 810, etc. It also may control of communicating with the networks, either through wireless or wired devices. Of course, this is just one embodiment of the portable computing device 801 and the number and types of portable computing devices 801 is limited only by the imagination.

As a result of the system, better information may be provided to a user at a point of sale. The information may be user specific and may be required to be over a threshold of relevance. As a result, users may make better informed decisions. The system is more than just speeding a process but uses a computing system to achieve a better outcome.

The physical elements that make up the remote computing device 841 may be further illustrated in FIG. 9. At a high level, the computing device 841 may include a digital storage such as a magnetic disk, an optical disk, flash storage, non-volatile storage, etc. Structured data may be stored in the digital storage such as in a database. The server 841 may have a processor 1000 that is physically configured according to computer executable instructions. It may also have a sound and video module 1005 which assists in displaying video and sound and may turn off when not in use to conserve power and battery life. The server 841 may also have volatile memory 1010 and non-volatile memory 1015.

The database 1025 may be stored in the memory 1010 or 1015 or may be separate. The database 1025 may also be part of a cloud of computing device 841 and may be stored in a distributed manner across a plurality of computing devices 841. There also may be an input/output bus 1020 that shuttles data to and from the various user input devices such as the microphone 806, the camera 808, the inputs such as the input pad 804, the display 802, and the speakers 810, etc. The input/output bus 1020 also may control of communicating with the networks, either through wireless or wired devices. In some embodiments, the application may be on the local computing device 801 and in other embodiments, the application may be remote 841. Of course, this is just one embodiment of the server 841 and the number and types of portable computing devices 841 is limited only by the imagination.

The user devices, computers and servers described herein may be general purpose computers that may have, among other elements, a microprocessor (such as from the Intel® Corporation, AMD®, ARM®, Qualcomm®, or MediaTek®); volatile and non-volatile memory; one or more mass storage devices (i.e., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC OS®, iOS®, or Android®. It is contemplated, however, that any suitable operating system may be used for the present invention. The servers may be a cluster of web servers, which may each be LINUX based and supported by a load balancer that decides which of the cluster of web servers should process a request based upon the current request-load of the available server(s).

The user devices, computers and servers described herein may communicate via networks, including the Internet, WAN, LAN, Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

What is claimed is:

1. A system for dynamically recommending a next object comprising:
    a database for storing payment transaction data of a user, wherein the stored payment transaction data comprises at least one of a transaction date, a transaction time, a transaction amount, a transaction type, a merchant identification (ID), a merchant type, a payment device type, or a transaction ID;
    an interface for receiving a new payment transaction data of the user;
    a processor, being data-accessibly coupled to the database, is configured to execute computer-executable instructions for:
        receiving the new payment transaction data of the user from the interface;
        retrieving the stored payment transaction data of the user from the database;
        retrieving further payment transaction data of further users, wherein the further payment transaction data has similar characteristics to the new payment transaction data of the user, wherein the similar characteristics are based on a function of k-nearest neighbors and a cosine similarity;
        determining if the further payment transaction data includes a minimum number of transactions and a minimum transaction amount spent within a time period;
        in response to a determination that the further payment transaction data includes a minimum number of transactions and a minimum transaction amount spent within the time period, determining if the minimum number of transactions occurred within a minimum geographic area;
        in response to a determination the minimum number of transactions occurred within the minimum geographic area, organizing the further payment transaction data as a series of temporally ordered sequences;
        generating a plurality of two-dimensional representations of the further payment transaction data, wherein each of the plurality of two-dimensional representations represents at least one of the further payment transaction data associated with the stored payment transaction data, wherein the plurality of two-dimensional representations forms a cluster of two-dimensional representations;
        overlaying the cluster of two-dimensional representations of the further payment transaction data with quadtree decomposition boxes that represent a geographic area, wherein a location of the further transaction data included in the cluster of two-dimensional representations occurred within the geographic area;
        decomposing the quadtree decomposition boxes based on the geographic area represented by the quadtree decomposition boxes and a number of payment transactions that occurred within the geographic area represented by the quadtree decomposition boxes, wherein decomposing the quadtree decomposition boxes includes:
            recursively subdividing the quadtree decomposition until the number of payment transactions that occurred in the geographic area meets a predefined threshold;
        building a distribution data as a function of the decomposed quadtree decomposition;
        mapping the distribution data to the new payment transaction data of the user; and
        generating a recommendation as a function of the new payment transaction data and mapping, wherein the recommendation identifies the next object.

2. The system of claim 1, wherein the similar characteristics comprises at least one of the following: merchant ID, merchant zip code, user zip code, merchant type, and transaction type.

3. The system of claim 1, wherein the distribution data comprises classes within the distribution data with corresponding proportions.

4. The system of claim 1, wherein the next object comprises a travel itinerary.

5. The system of claim 4, wherein the travel itinerary comprises a potential destination.

6. The system of claim 4, wherein the travel itinerary comprises a point-of-interest.

7. A computer-implemented method for dynamically recommending a travel itinerary comprising:
    storing payment transaction data of a user in a database, wherein the stored payment transaction data comprises at least one of a transaction date, a transaction time, a transaction amount, a transaction type, a merchant identification (ID), a merchant type, a payment device type, or a transaction ID;
    receiving a new payment transaction data via an interface of the user;
    receiving, by a processor, the new payment transaction data of the user from the interface;
    retrieving, by the processor, stored payment transaction data of the user from the database;
    retrieving, by the processor, further payment transaction data of further users, wherein the further payment transaction data has similar characteristics to the new payment transaction data of the user, wherein the similar characteristics are based on a function of k-nearest neighbors and a cosine similarity;
    determining if the further payment transaction data includes a minimum number of transactions and a minimum transaction amount spent within a time period;
    in response to a determination that the further payment transaction data includes a minimum number of transactions and a minimum transaction amount spent within the time period, determining if the minimum number of transactions occurred within a minimum geographic area;
    in response to a determination the minimum number of transactions occurred within the minimum geographic area, organizing, by the processor, the further payment transaction data as a series of temporally ordered sequences;
    assigning, by the processor, a plurality of vectors embedding data to each of the stored payment transaction data, wherein each of the plurality of vectors represents at least one of the further payment transaction data associated with the stored payment transaction data, wherein the plurality of vectors comprises a cluster of vectors;
    overlaying, by the processor, the cluster of vectors that represent the at least one of the further payment transaction data with quadtree decomposition boxes that represent a geographic area, wherein a location of the at least one of the further payment transaction data included in the cluster of vectors occurred within the geographic area;

decomposing, by the processor, the quadtree decomposition boxes based on the geographic area represented by the quadtree decomposition boxes and a number of payment transactions that occurred within the geographic area represented by the quadtree decomposition boxes, wherein decomposing the quadtree decomposition boxes includes:

recursively subdividing, by the processor, the quadtree decomposition boxes until the number of payment transactions that occurred in the geographic area meets a predefined threshold;

building, by the processor, a distribution data as a function of the decomposed quadtree decomposition, said distribution data identifying classes within the distribution data with corresponding proportions;

mapping, by the processor, the distribution data to the new payment transaction data of the user; and generating, by the processor, a recommendation as a function of the new payment transaction data and mapping, wherein the recommendation identifies the travel itinerary.

8. The computer-implemented method of claim 7, wherein the travel itinerary comprises a potential destination.

9. The computer-implemented method of claim 7, wherein the travel itinerary comprises a point-of-interest.

10. The computer-implemented method of claim 7, wherein the similar characteristics comprises at least one of the following: merchant ID, merchant zip code, user zip code, merchant type, and transaction type.

11. The computer-implemented method of claim 7, wherein the distribution data comprises classes within the distribution data with corresponding proportions.

12. The computer-implemented method of claim 7, wherein the vector comprises a two-dimensional representation for each of the retrieved payment transaction data.

13. A tangible non-transitory computer-readable medium having stored thereon computer-executable instructions for dynamically recommending a next object, said computer-executable instructions configured to be executed by a processor comprising:

storing payment transaction data of a user in a database, wherein the stored payment transaction data comprising at least one of a transaction date, a transaction time, a transaction amount, a transaction type, a merchant identification (ID), a merchant type, a payment device type, or a transaction ID;

receiving a new payment transaction data via an interface of the user;

receiving the new payment transaction data of the user from the interface;

retrieving stored payment transaction data of the user from the database;

retrieving further payment transaction data of further users, wherein the further payment transaction data has similar characteristics to the new payment transaction data of the user, wherein the similar characteristics are based on a function of k-nearest neighbors and a cosine similarity;

determining if the further payment transaction data includes a minimum number of transactions and a minimum transaction amount spent within a time period;

in response to a determination that the further payment transaction data includes a minimum number of transactions and a minimum transaction amount spent within the time period, determining if the minimum number of transactions occurred within a minimum geographic area;

in response to a determination the minimum number of transactions occurred within the minimum geographic area, organizing the further payment transaction data as a series of temporally ordered sequences;

assigning a plurality of vectors embedding data to each of the stored payment transaction data, wherein each of the plurality of vectors represents at least one of the further payment transaction data associated with the stored payment transaction data, wherein the plurality of vectors form a cluster of vectors;

overlaying the cluster of vectors that represent the at least one of the further payment transaction data with quadtree decomposition boxes that represent a geographic area, wherein a location of the at least one of further payment transaction data included in the cluster of vectors occurred within the geographic area;

decomposing the quadtree decomposition boxes based on the geographic area represented by the quadtree decomposition boxes and a number of payment transactions that occurred in the geographic area represented by the quadtree decomposition boxes, wherein decomposing the quadtree decomposition boxes includes:

recursively subdividing the quadtree decomposition boxes until the number of payment transactions that occurred in the geographic area meets a predefined threshold;

building a distribution data as a function of the decomposed quadtree decomposition, said distribution data identifying classes within the distribution data with corresponding proportions;

mapping the distribution data to the new payment transaction data of the user; and generating a recommendation as a function of the new payment transaction data and mapping, wherein the recommendation identifies the next object.

14. The tangible non-transitory computer-readable medium of claim 13, wherein the next object comprises a potential destination of a travel itinerary.

15. The tangible non-transitory computer-readable medium of claim 14, wherein the travel itinerary comprises a point-of-interest.

16. The tangible non-transitory computer-readable medium of claim 13, wherein the similar characteristics comprises at least one of the following: merchant ID, merchant zip code, user zip code, merchant type, and transaction type.

17. The tangible non-transitory computer-readable medium of claim 13, wherein the distribution data comprises classes within the distribution data with corresponding proportions.

18. The tangible non-transitory computer-readable medium of claim 13, wherein the vector comprises a two-dimensional representation for each of the retrieved payment transaction data.

* * * * *